United States Patent
O'Brien et al.

(10) Patent No.: US 10,664,799 B2
(45) Date of Patent: May 26, 2020

(54) SUPPLY MESH PLATFORM

(71) Applicant: OMNY, INC., Redwood City, CA (US)

(72) Inventors: Sean O'Brien, Atlanta, GA (US); Alan Pohl, Johns Creek, GA (US); Maik A. Lindner, Marietta, GA (US)

(73) Assignee: OMNY, Inc., Redwood City, CA (US)

( * ) Notice: Subject to any disclaimer, the term of this patent is extended or adjusted under 35 U.S.C. 154(b) by 230 days.

(21) Appl. No.: 16/024,118

(22) Filed: Jun. 29, 2018

(65) Prior Publication Data

US 2020/0005224 A1 Jan. 2, 2020

(51) Int. Cl.
*G06Q 10/08* (2012.01)
*H04L 9/32* (2006.01)
*G06Q 10/06* (2012.01)

(52) U.S. Cl.
CPC ......... *G06Q 10/087* (2013.01); *G06Q 10/063* (2013.01); *G06Q 10/08355* (2013.01); *H04L 9/3236* (2013.01); *H04L 2209/38* (2013.01)

(58) Field of Classification Search
CPC . H04L 9/3236; H04L 2209/38; H04L 9/3239; H04L 9/32; G06Q 10/08355; G06Q 10/087; G06Q 10/063; G06Q 10/08; G06Q 10/06
USPC ............... 705/28–30; 709/204, 217–223; 235/363–385
See application file for complete search history.

(56) References Cited

U.S. PATENT DOCUMENTS

| | | | | |
|---|---|---|---|---|
| 7,761,591 B2 * | 7/2010 | Graham | ................. | G06Q 40/02 709/204 |
| 7,810,084 B2 * | 10/2010 | Egetoft | ................. | G06Q 10/06 717/149 |
| 7,991,659 B2 * | 8/2011 | Berry | ................... | G06Q 10/087 705/29 |
| 10,250,639 B2 * | 4/2019 | Redlich | ................. | G06Q 10/10 |
| 10,296,258 B1 * | 5/2019 | Richardson | ......... | H04L 67/1095 |
| 10,419,218 B2 * | 9/2019 | Bonnell | ................ | H04L 9/3247 |
| 10,438,209 B2 * | 10/2019 | Kurian | .................... | H04L 63/12 |
| 10,445,698 B2 * | 10/2019 | Hunn | ...................... | G06F 16/93 |
| 10,552,805 B2 * | 2/2020 | Chan | .................... | G06F 21/645 |

(Continued)

OTHER PUBLICATIONS

Hang Yang et al., "Mediating Dynamic Supply Chain Formation by Collaborative Single Machine Earliness/Tardiness Agents in Supply Mesh", Mathematical Problems in Engineering, vol. 2014, Article ID 535890, 21 pages, 2014. https://doi.org/10.1155/2014/535890.

*Primary Examiner* — Andrew Joseph Rudy
(74) *Attorney, Agent, or Firm* — Andre J. Bahou; Christopher T. McNeill; Waller Lansden Dortch & Davis, LLP

(57) ABSTRACT

A computer-implemented method for producing a supply mesh is disclosed. The method may include retrieving, from a distributed ledger, entity data. The entity data may include one or more features of a first set of one or more entities. The method may include retrieving, from the distributed ledger, relationship data. The relationship data may include a first set of one or more relationships between the first set of one or more entities. The method may include generating the supply mesh. Generating the supply mesh may include generating two or more value links based on the entity data. Generating the supply mesh may include generating one or more transitions based on the relationship data, each transition connecting two value links.

20 Claims, 8 Drawing Sheets

(56) References Cited

U.S. PATENT DOCUMENTS

| | | | |
|---|---|---|---|
| 10,581,613 B2 * | 3/2020 | Ford | H04L 9/3236 |
| 10,608,910    * | 3/2020 | Moeller | H04L 63/166 |
| 2013/0159045 A1 | 6/2013 | Ettl et al. | |
| 2014/0019471 A1 | 1/2014 | Linton et al. | |
| 2015/0046363 A1 | 2/2015 | McNamara et al. | |
| 2015/0178645 A1 | 6/2015 | Yuan et al. | |
| 2016/0104089 A1 | 4/2016 | Speich et al. | |
| 2018/0083771 A1 | 3/2018 | Bonnell | |

* cited by examiner

SUPPLY MESH PLATFORM

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present disclosure relates generally to a supply mesh and more particularly, the present disclosure relates to a supply mesh platform. A supply chain can include a linear flow of goods, services, or data from a starting point to an eventual end point. However, each actor in the supply chain usually has only limited visibility of the supply chain. In many cases, an actor only knows from whom the actor receives the goods, services, or data and to whom the actor sends goods, services, or data. An actor may use an online marketplace to view the availability of goods, services, or data from other actors. However, the online marketplace may use centralized data and process execution. What is needed then is a supply mesh platform that include decentralized, distributed data storage and process execution and a bidirectional flow of data.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect of the disclosure is a computer-implemented method for producing a supply mesh. The method may include retrieving, from a distributed ledger, entity data. The entity data may include one or more features of a first set of one or more entities. The method may include retrieving, from the distributed ledger, relationship data. The relationship data may include a first set of one or more relationships between the first set of one or more entities. The method may include generating the supply mesh. Generating the supply mesh may include generating two or more value links based on the entity data. Generating the supply mesh may include generating one or more transitions based on the relationship data, each transition connecting two value links.

Another aspect of the disclosure is a computer-implemented method for bidirectional data transfer within a supply mesh. The method may include providing the supply mesh. The supply mesh may include two or more value links. Each value link may include one or more value link features. The supply mesh may include one or more transitions. Each transition may connect two value links. In one embodiment, the method may include retrieving, through a distributed ledger, one or more value link features of a first value link. The method may include determining whether a value link feature of the first value link includes data indicating the first value link fulfills, at least in part, a user inquiry or business need of a second value link. The method may include correlating the first value link to the user inquiry or business need.

A further aspect of the disclosure is a computer-implemented method for a decentralized supply mesh platform. The method may include providing access, through a distributed ledger, to a first set of data comprising entity data and relationship data. The method may include retrieving, through the distributed ledger, a second set of data comprising entity data and relationship data. The second set of data may include data gathered from a plurality of data stores. The method may include generating a supply mesh based on the first set of data and the second set of data. The supply mesh may include two or more value links based on the entity data of the first and second sets of data. The supply mesh may include one or more transitions, each transition connecting two value links based on the relationship data of the first and second sets of data. The method may include forming a business path in the supply mesh, the business path comprising at least two value links connected via a transition.

Numerous other objects, advantages and features of the present disclosure will be readily apparent to those of skill in the art upon a review of the following drawings and description of a preferred embodiment.

DETAILED DESCRIPTION

Figure 1:
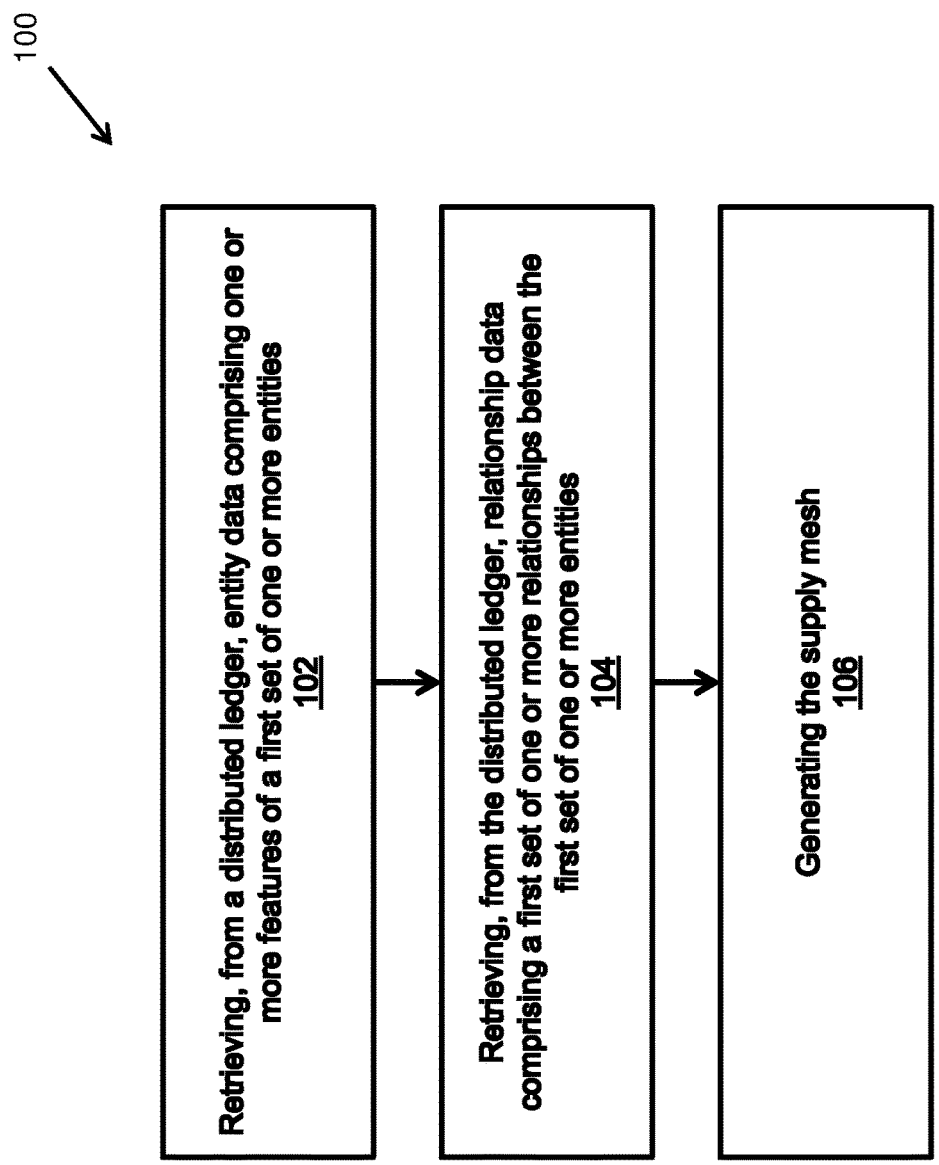
FIG. 1 is a schematic block flowchart illustrating one embodiment of a method for producing a supply mesh.

While the making and using of various embodiments of the present invention are discussed in detail below, it should be appreciated that the present invention provides many applicable inventive concepts that are embodied in a wide variety of specific contexts. The specific embodiments discussed herein are merely illustrative of specific ways to make and use the invention and do not delimit the scope of the invention. Those of ordinary skill in the art will recognize numerous equivalents to the specific apparatus and methods described herein. Such equivalents are considered to be within the scope of this invention and are covered by the claims.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

The phrases "in one embodiment," "in some embodiments, "in an embodiment," "in another embodiment," and the like, as used herein do not necessarily refer to the same embodiment or different embodiments, although they may, and mean "one or more but not all embodiments" unless expressly specified otherwise. Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, or states. Thus, such conditional language is not generally intended to imply that features, elements or states are in any way required for one or more embodiments or that one or more embodiments necessarily include logic for deciding, with or without author input or prompting, whether these features, elements or states are included or are to be performed in any particular embodiment.

In the present specification "comprise" means "includes or consists of" and "comprising" means "including or consisting of." Furthermore, the term "based on" indicates the presence of an influence, but does not necessarily exclude the presence of other influences. Thus, the term "based on" means "based on, at least in part." An enumerated listing of items (e.g. "first," "second," "third," and the like) does not imply any order or that any or all of the items are mutually exclusive or mutually inclusive, unless expressly specified otherwise. The phrase "or" does not mean mutual exclusivity unless expressly stated, and, thus, means "and/or."

The term "supply mesh," as used herein, may include a data representation on a computing platform that represents a set of entities, one or more features of the entities, one or more relationships between the entities, and the goods, services, data, or the like that may flow between these entities. In one embodiment, the supply mesh may be implemented as a computer program product. In one embodiment, a user of the supply mesh may access the data of the supply mesh to obtain information about the entities, their features, relationships, or the like. In one embodiment, the term "access the data" and other similar terms, as used herein, may include a user of the supply mesh being able to read the data, but not be able to modify a portion of the data. The user may use this data to make business decisions. In some embodiments, a user may include an entity in the supply mesh or an entity not represented in the supply mesh.

In some embodiments, the data used to generate, use, or update the supply mesh, or the like, (the "supply mesh data") may be accessed through a distributed ledger. As used herein, a "distributed ledger" may include copies of a data store that are synchronized and distributed across multiple computing devices called nodes. The supply mesh data may not be stored on the distributed ledger. Instead, the distributed ledger may include data referencing the location of supply mesh data. In some embodiments, the supply mesh data may be stored on multiple devices. These devices may include computing devices, servers, cloud storage devices, or the like. The distributed ledger may provide access to the supply mesh data by referencing a device, a location on a device, or the like. A device containing supply mesh data may be configured to provide the supply mesh data stored on the device to a requesting device. The terms "accessing data through a distributed ledger," "retrieving data from a distributed ledger," or the like may include retrieving supply mesh data from a device storing supply mesh data where a reference to the supply mesh data is contained on the distributed ledger. In some embodiments, a distributed ledger may be permissioned or permissionless.

An "entity," in some embodiments, may include a person, an organization, or the like. An entity may include a subdivision or part of an organization, such as a department, branch, or the like, in a same or different geographic location. An entity may include an aspect of a person or organization, such as a computing system an organization uses, third party providers, or the like. As used herein, a "feature" of an entity may include information about an entity. For example, a feature may include an entity's name, location, type, assets, inventory, ability to provide a service, or the like. As used herein, "entity data" may include data about an entity, one or more features of the entity, or the like. In another embodiment, a "relationship" between two entities may include one entity supply a good, service, or data to the other entity. "Relationship data" may include data about one or more relationships.

In one embodiment, the supply mesh may include a bidirectional flow of data or the like. In some embodiments, "bidirectional flow" may include data about an entity, a relationship between two or more entities, or the like being available to a user of the supply mesh, even if the user is not directly part of the entity or relationship. Data about the user may also be visible to other users of the supply mesh, and, thus, the flow of data may be bidirectional. In some embodiments, entities may use this bidirectional data, other supply mesh data, or the like to make better business decisions. These flows are more than downstream flow of goods, services, data, or the like as may be seen in a supply chain. Using the supply mesh, an entity in the supply mesh, user of the supply mesh, or the like may have access to data that is not part of its section of a supply chain. The entity may use this data to form business relationships and improve its own flow of goods, services, data, or the like.

To help define "bidirectional flow," it may be useful to contrast it with a unidirectional flow found in traditional supply chains. In a traditional supply chain, an entity may only have data about its immediate neighbors (i.e. the entity it receives a product, data, or the like from and the entity that it sends a product, data, or the like to). For example, Business A, a pharmaceutical dispensary, may be in a supply chain and may receive products from Business B, a distributor. Business A may supply the products to hospitals, doctor offices, and pharmacies, or the like. If the Business A needs more of a product, Business A may request more of the product from Business B. Furthermore, the data may travel in only one direction. For example, Business A may send data in the form of a request for more product to Business B. Business B may not send any data to Business A, but may send products to Business A. In some embodiments, Business A may have a limited view of its role in the supply chain. In response to this, Business A may not immediately know who supplies the product to Business B, if there are other distributors that also supply the same product to other dispensaries, or the like. As used herein, "immediately know," may mean that Business A cannot find out this information without investing significant resources into the investigation. Furthermore, Business A may not immediately know of other customers it could supply its products to. It also may not immediately know the inventory of its customers, price data, or the like or data about its customer's customers.

In contrast, in a supply mesh with a bidirectional flow of data, entities may have downstream information immediately available. For example, Business A, a manufacturer who manufactures a pharmaceutical product that eventually is placed in the inventory of Business B, a hospital, may be able to immediately know that several hospitals are running low on a certain product. In response, Business A may manufacture an extra supply of that product to preemptively handle an expected increase in the demand of that product. Without the bidirectional flow of data, Business A would have only known the data it received from, Business C, the distributor Business A ships products, to and may not have known about the approaching shortage at the hospitals. Thus, an entity in a supply mesh may be able to access data about another entity in the supply mesh that it is not immediately doing business with.

Furthermore, in a supply mesh with a bidirectional flow of data, entities may have access to data about an entity they have no relationship with in a supply chain. For example, Business A from the above example may wish to dispense a new kind of pharmaceutical product. Business B may not carry the new product. Business A may receive data from the supply mesh about Business C, a second distributor, that can supply Business A with the new product. Even though Business C and Business A have no relationship, this data may be available to them through the supply mesh.

In another example, two hospitals, Businesses A and B, in the same hospital system may each receive a pharmaceutical product from Business C, a distributor. The Business A's inventory of the pharmaceutical product may be low and Business B's inventory of the same pharmaceutical product may include a surplus. In a traditional supply chain scenario, data may flow upstream (i.e. from the hospitals to Business C in the form of a hospital requesting more pharmaceutical product when it runs low), but data does not flow in other directions (i.e. between Businesses A and B). Thus, each hospital may not know about the other's inventory of the pharmaceutical product, and Business A may order more product from Business C while Business B may return some of the surplus product before it expires. This may cost the hospital system more money than if Business B had sent Business A a portion of its surplus. However, with a supply mesh with bidirectional flow of data, Business B may send Business A data about the pharmaceutical product surplus, and in response, Business A may request a portion of the surplus.

FIG. 1 depicts one embodiment of a method 100. The method 100 may include a computer-implemented method for generating a supply mesh. In some embodiments, the method 100 may include retrieving 102, from a distributed ledger, entity data. The entity data may include one or more features of a first set of one or more entities. In one embodiment, the entity data may include data about one or more businesses, customers, or the like. The one or more features may include an entity's name, location, or type (e.g. manufacturer, distributor, customer, or the like). The one or more features may include a product an entity provides, a service an entity provides, or data the entity provides. The one or more features may include a price at which the entity provides a service, sells a product, ships a product, or the like. The one or more features may include a temperature range at which the entity can store or transport a product. The one or more features may include an inventory of the entity, whether the entity has a certain good in its inventory, provides a certain service, or the like. The one or more features may include whether an entity is within a business relationship with another entity, whether an entity is part of a certain business path, or the like. The one or more features may include other data about an entity.

In some embodiments, a business may include a single entity. For example, a retail business may have several different store locations, multiple warehouses, a company headquarters, or the like. In one embodiment, the entity data may include the business as a single entity. In another embodiment, a business may include multiple entities, for example, the retailer business may include an entity for each store location, warehouse, or the like. The entity data may include data about the business as multiple entities.

In some embodiments, the data may include data about a point where data may be generated, received, processed, or sent. The data may include data about one or more computing devices, systems, or the like. For example, in one embodiment, the data may include a cloud storage or cloud computing platform. The cloud storage or cloud computing platform may belong to an entity. In some embodiments, the data may include data about a database, such as a government database, a product database, or the like.

In some embodiments, the method 100 may include retrieving 104, from the distributed ledger, relationship data. Retrieving 104 the relationship data may include retrieving the relationship data from a distributed ledger, such as the distributed ledger mentioned above. The relationship data may include a first set of one or more relationships between the first set of one or more entities. For example, the relationship data may include data about an entity supplying a product or rendering a service to another entity. The relationship data may include data about a business relationship (e.g. a business partnership, a parent-subsidiary, a sponsorship, or the like). The relationship data may include one entity sending data to another entity. In some embodiments, relationship data may include or indicate a bidirectional flow of data, products, services, or the like.

In one embodiment, the method 100 may include generating 106 the supply mesh. In some embodiments, generating 106 the supply mesh may include generating two or more value links based on the entity data. As used herein, the term "value link" may include a data representation of an entity, a group of entities, or the like as described herein. The term "value link" may include an entity or group of entities represented by the value link.

In some embodiments, generating a value link may include generating the value link based on multiple entities of the first set of one or more entities. For example, a retail business may include multiple store locations, multiple warehouses, and a company headquarters. The supply mesh may represent the retailer as one value link. In one embodiment, generating the one or more value links may include generating multiple value links based on a single entity of the first set of one or more entities. For example, a single company may perform multiple business functions. For example, Business A may distribute products received from a third party. Business A may also store and process data for other entities. The supply mesh may represent Business A as at least four value links: one value link for the receiving aspect of Business A, one value link for the distributing aspect of Business A, one value link for the data storage and processing of Business A, and one value link for the computing system of Business A. In some embodiments, whether the supply mesh generates one value link for multiple entities or whether the supply mesh generates multiple value links for one entity may be based on user configuration, the data about the relationship between the multiple entities, or the like.

In one embodiment, generating the one or more value links may include generating one or more value link features for each value link. A value link feature may include data about a value link. For example, as mentioned above, the entity data about the first set of one or more entities may include one or more features of the one or more entities. Generating the one or more value link features for each value link may include generating the one or more value link features based on the one or more features of each entity represented by a value link.

In one embodiment, generating a value link may include using data provided by an entity represented by the value link. In another embodiment, generating a value link may include using data provided by an entity not represented by the value link. For example, Business A may add data to the distributed ledger about itself. This data may include inventory data, price data, or the like. Generating the value link that represents Business A may include generating one or more value link features based on the data added by Business A. Business A may add data to the distributed ledger about Business B. Business B may not have added data to the distributed ledger or even know of the existence of the supply mesh. Generating the value link that represent Business B may include generating the value link or one or more value link features based on the data Business A added.

In another embodiment, generating 106 the supply mesh may include generating one or more transitions. Generating the one or more transitions may be based on relationship data. Each transition may connect two value links. A transition may be based on the data about the first set of one or more relationships, the first set of the one or more entities, or the like. For example, a transition may connect a value link representing Business A and value link representing Business B. The transition may be based on data about Business A shipping a product to Business B, Business A being the parent company of the Business B, Business B sending data to Business A, or the like.

In one embodiment, generating a transition may include using data provided by a value link connected by the transition. In another embodiment, generating a transition may include using data provided by a value link not connected by the transition. For example, Business A may add data to the distributed ledger representing that Business A manufactures a product for Business B. Generating a transition may include adding a transition between the value link for Business A and the value link for Business B. Business A may add data to the distributed ledger representing that Business B ships the product to Business C. Generating a transition may include adding a transition between the value links for Business B and Business C.

In one embodiment, the supply mesh may include bidirectional flow of data between value links. The bidirectional flow of data may include the data of a first value link being accessible to a second value link, even though the first and second value links may not be connected by a transition. When the first and second value links represent separate businesses, companies, or the like, the bidirectional flow may be referred to as "intercompany" data flow. When the first and second value links represent different parts of the same business, company, or the like, the bidirectional flow may be referred to as "intracompany" data flow. In some embodiments, each type of bidirectional flow may include its own concerns.

In some embodiments, intercompany data flow may include a value link supplying data to be used in a smart contract. A smart contract may include an electronic agent (e.g. a computer program) that automatically executes certain functionality in response detecting fulfillment of a condition. In some embodiments, a smart contract detecting the fulfillment of the condition may include receiving data about that condition from an oracle. An oracle may include trusted data flow that provides data to a smart contract. In one embodiment, an oracle may include data from the intercompany data flow of the supply mesh. The smart contract may be implemented on the supply mesh platform or on another platform.

In one embodiment, an entity may benefit from the intracompany dataflow of the supply mesh. A company, business, or the like, may have an inventory tracking system for each location, branch, or the like, but it may not have an overarching inventory tracking system. In some embodiments, the intracompany dataflow of the supply mesh may provide that inventory tracking system. The supply mesh may also provide intracompany data flow to provide different branches, departments, or the like of a same company with data about each other that other systems the company uses may not.

In one embodiment, the method 100 may include making available, though the distributed ledger, second entity data. Second entity data, in some embodiments, may include entity data not yet in the supply mesh. Second entity data may include one or more features of an entity where the entity is represented in the supply mesh by one or more value links, but the one or more features are not. Second entity data may include entity data about an entity not yet represented in the supply mesh. In some embodiments, making the second entity data available through the distributed ledger may include adding data to the distributed ledger referencing the location of the second entity data.

In some embodiments, the method 100 may include making available, through the distributed ledger, second relationship data. Second relationship data may include relationship data not yet in the supply mesh. In one embodiment, the second relationship data may include one or more relationships between the first set of one or more entities. For example, a supply mesh may already include a value link representing a Business A, a shipping company and a value link representing a Business B, a retailer. The second relationship data may include data representing that Business A ships products to Business B. In some embodiments, the second relationship data may include one or more relationships between the second set of one or more entities. For example, the second relationship data may include data about a relationship between two entities in the second entity data. In another embodiment, the second relationship data may include one or more relationships between the first set of one or more entities and the second set of one or more entities. For example, a supply mesh may already include a value link representing Business A. The second entity data may include data representing Business B. The second relationship data may include data representing that Business A ships products to Business B.

In another embodiment, the method 100 may include updating the supply mesh based on the second entity data or the second relationship data. In one embodiment, updating the supply mesh may include retrieving the second entity data or the second relationship through the distributed ledger. In one embodiment, updating the supply mesh may include generating one or more value links based on the second entity data. Updating the supply mesh may include generating one or more transitions based on the second relationship data. Updating the supply mesh may include connecting one or more value links with the generated transitions.

In one embodiment, the method 100 may include removing a value link from the supply mesh. The method 100 may include removing a value link feature from the supply mesh. The method 100 may include removing a transition from the supply mesh. In some embodiments, removing a value link, value link feature, or transition from the supply mesh may include invalidating the corresponding data in the distributed ledger. For example, Business A may go out of business. In response, removing a value link from the supply mesh may include removing the one or more value links representing Business A. Removing a value link feature from the supply mesh may include removing the one or more value link features of the one or more value links representing Business A. Removing a transition may include removing one or more transitions that connected the one or more value links representing Business A to another value link. In some embodiments, invalidating the corresponding data in the distributed ledger may include adding data to the distributed ledger indicating the invalidation, making the invalidated data referenced by the distributed ledger no longer available, or the like.

In some embodiments, while intercompany data flow may include several benefits such as readily forming business relationships, data security may be a concern. An entity may wish to have certain data accessible to some entities in the supply mesh, but not have the same data accessible to other entities. In some embodiments, the method 100 may include filtering one or more value links, one or more value link features, or one or more transitions from access by a supply mesh user. The filtering may include configuring a value link, value link feature, transition, or the like. The configuration may include designating a value link, value link feature, transition, or the like as permissioned or unpermissioned. The configuration of certain data being permissioned or unpermissioned may be based on the user attempting to access the data. Permissioned data may include data that is unavailable to a user of the supply mesh that does not have permission to access the data. Unpermissioned data may include data that is available to the user. A configuration that may manage permissions may include a configuration set by a user, the supply mesh platform, or the like. In some embodiments, a permission configuration may include a configuration about which data is permissioned or unpermissioned, which entities or types of entities have access to the data, or the like. In some embodiments, designating data as permissioned may include encrypting the data, and a user obtaining permission to access the permissioned data may include the user obtaining a way to decrypt the encrypted data.

For example, in one example embodiment, Business A may want business partners to see its shipping prices, but may not want entities that it does not already do business with to know these same prices. Business A may do this for negotiation purposes. In response, Business A may configure a permission associated with the value link that represents Business A. Business A may configure a permission of its value link to show the price value link feature only to those entities that already do business with Business A and to deny access to the price value link feature to other users of the supply mesh. In one embodiment, Business A, to encourage other value links to consider using Business A for shipping products may configure a permission of its value link to show what kinds of products it ships.

In another example, with intracompany data flow, data security between value links of the same company may be less of a concern. In response, a permissioned configuration for a first value link may include designating its data as unpermissioned to a second value link that is part of the same company, business, or the like as the first value link. The permissioned configuration may include designating some of the first value link's data as permissioned to a third value link that is not part of the same company.

Figure 2A:
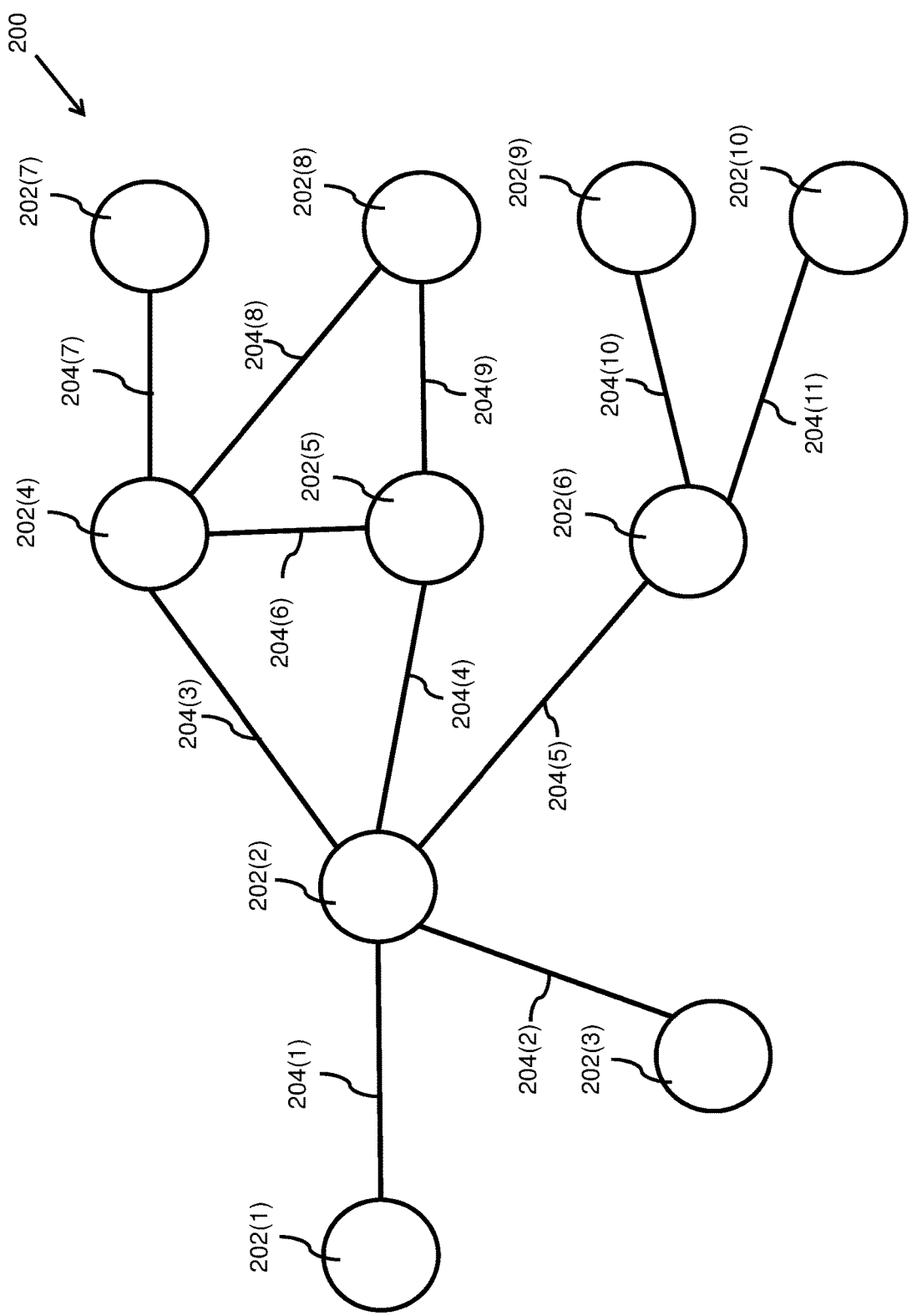
FIG. 2A is a schematic block diagram illustrating one embodiment of a supply mesh.

FIG. 2A depicts one embodiment of a supply mesh 200. The supply mesh 200 may represent one or more entities, relationships between entities, or the like as described herein. The supply mesh 200 may represent data associated with these entities, relationships, or the like. In some embodiments, a supply mesh 200 may include a graph, and a value link may include a node (or vertex) of the graph, and a transition may include an edge of the graph. In some embodiments, the supply mesh 200 may include one or more value links 202(1)-(10). As used herein, the designation "value link 202" refers to any of the value links 202(1)-(10), and the designation "value link 202(1)," "value link 202(2)," or the like may refer to a specific value link of the one or more value links 202(1)-(10) and may illustrate examples of interaction between two or more value links of the one or more value links 202(1)-(10). For example, as depicted in FIG. 2, the value link 202(1) may represent a manufacturer entity called "Business A" in the supply mesh 200. The value link 202(2) may represent a distributor entity called "Business B" and the value link 202(3) may represent a data center "Business C." Value links 202(4)-(6) may represent shipping company entities called "Businesses D, E, and F," respectively. Value links 202(7)-(10) may represent retailer entities called "Businesses G, H, I and J," respectively.

In some embodiments, the supply mesh 200 may include one or more transitions 204(1)-(11) (referred to as "transition 204" unless specified otherwise, as explained above in relation to the one or more value links 202(1)-(10)). A transition 204 may connect two or more value links 202 together. For example, as depicted in FIG. 2, a transition 204 may connect two value links 202 together. In some embodiments, a transition may connect three or more value links 202. A transition 204 may include a business relationship between the connected value links 202.

FIG. 2A depicts one embodiment of generating a value link based on a plurality of entities of the first set of one or more entities. In one embodiment, the value links 202(1)-(10) may include value links 202 that represent one or more entities of the first set of one or more entities. The first set of one or more entities may further include multiple subsidiaries of Business A, represented by value link 202(1). In response to user configuration or the like, generating the value link 202(1) may include generating the value link 202(1) based on the multiple subsidiaries. The supply mesh 200 may not generate a value link 202 for each individual subsidiary of Business A.

FIG. 2A depicts one embodiment of generating a plurality of value links based on a single entity of the first set of one or more entities. For example, the first set of one or more entities may include Business B, represented by value link 202(2). Entity data for Distributor A may include data about a data center operated by Business B. In response to user configuration or the like, generating the two or more value links based on the one or more features of the first set of the one or more entities may include generating a value link 202(3) for the data center of Business B.

Figure 2B:
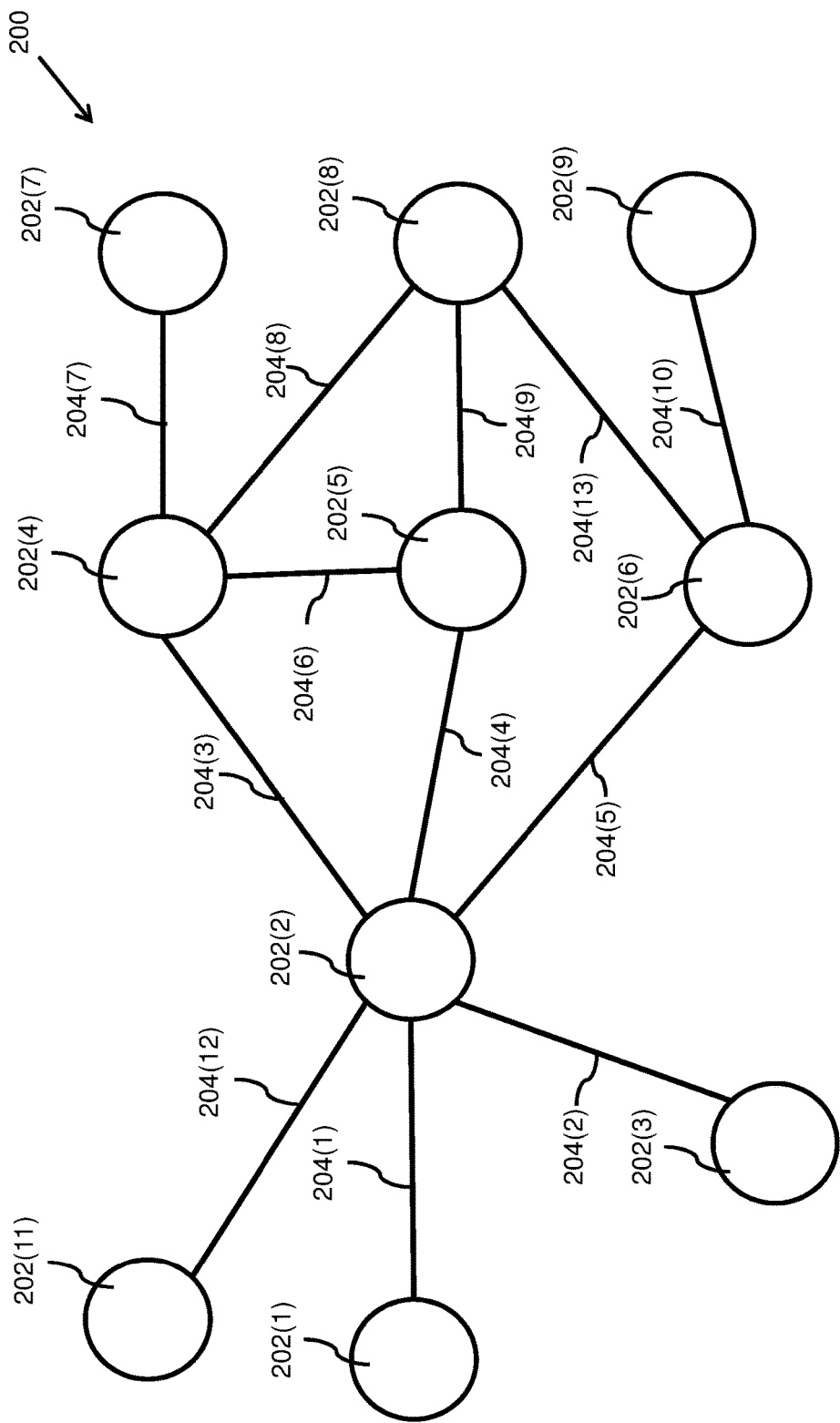
FIG. 2B is a schematic block diagram illustrating one embodiment of a supply mesh.

FIG. 2B depicts one embodiment of the supply mesh 200. The supply mesh 200 may include the value links 202(1)-(9) and the transitions 204(1-10) as described above in relation to FIG. 2A. FIG. 2B depicts one embodiment of updating the supply mesh 200. Updating the supply mesh 200 may be in response to one or more value links 202 or transitions 204 being added or removed from the supply mesh 200. A value link 202 or transition 204 may be added based on entity data or relationship data made available through the distributed ledger. A value link 202 or transition 204 may be removed based on entity data or relationship data invalidated through the distributed ledger.

For example, removing a value link from the supply mesh may include removing the value link 202(10) from the supply mesh 200. Removing a transition from the supply mesh may include removing the transition 202(11) from the supply mesh 200. As can be seen in FIG. 2B, the value link 202(10) is no longer in the supply mesh 200 and the transition 204(11) that connected the value link 202(6) to the value link 202(10) is no longer in the supply mesh.

FIG. 2B depicts one embodiment of a supply mesh 200 in response to updating the supply mesh based on second entity data or second relationship data. The second entity data may include entity data not included if the first set of entity data. For example, the second entity data may include data about Business K, a second manufacturer. The second relationship data may include relationship data not included in the first set of relationship data. The second entity data or second relationship data may be made available through the distributed ledger. The second relationship data may include one or more relationships between the first set of one or more entities. For example, the second relationship data may include data about Business F (represented by the value link 202(6)) shipping a product to Business H (represented by the value link 202(8)). The second relationship data may include one or more relationships between the first set of one or more entities and the second set of one or more entities. For example, the second relationship data may include data about Business K supplying a product to Business B (represented by the value link 202(2)).

In one embodiment, updating the supply mesh based on the second entity data may include generating a value link 202(11) based on the entity data of Business K. Updating the supply mesh based on the second relationship data may include generating a transition 202(12). The transition 202(12) may connect the value link 202(11) and the value link 202(2). Updating the supply mesh based on the second relationship data may include generating a transition 202(13). The transition 202(13) may connect the value link 202(6) and the value link 202(8).

Figure 3:
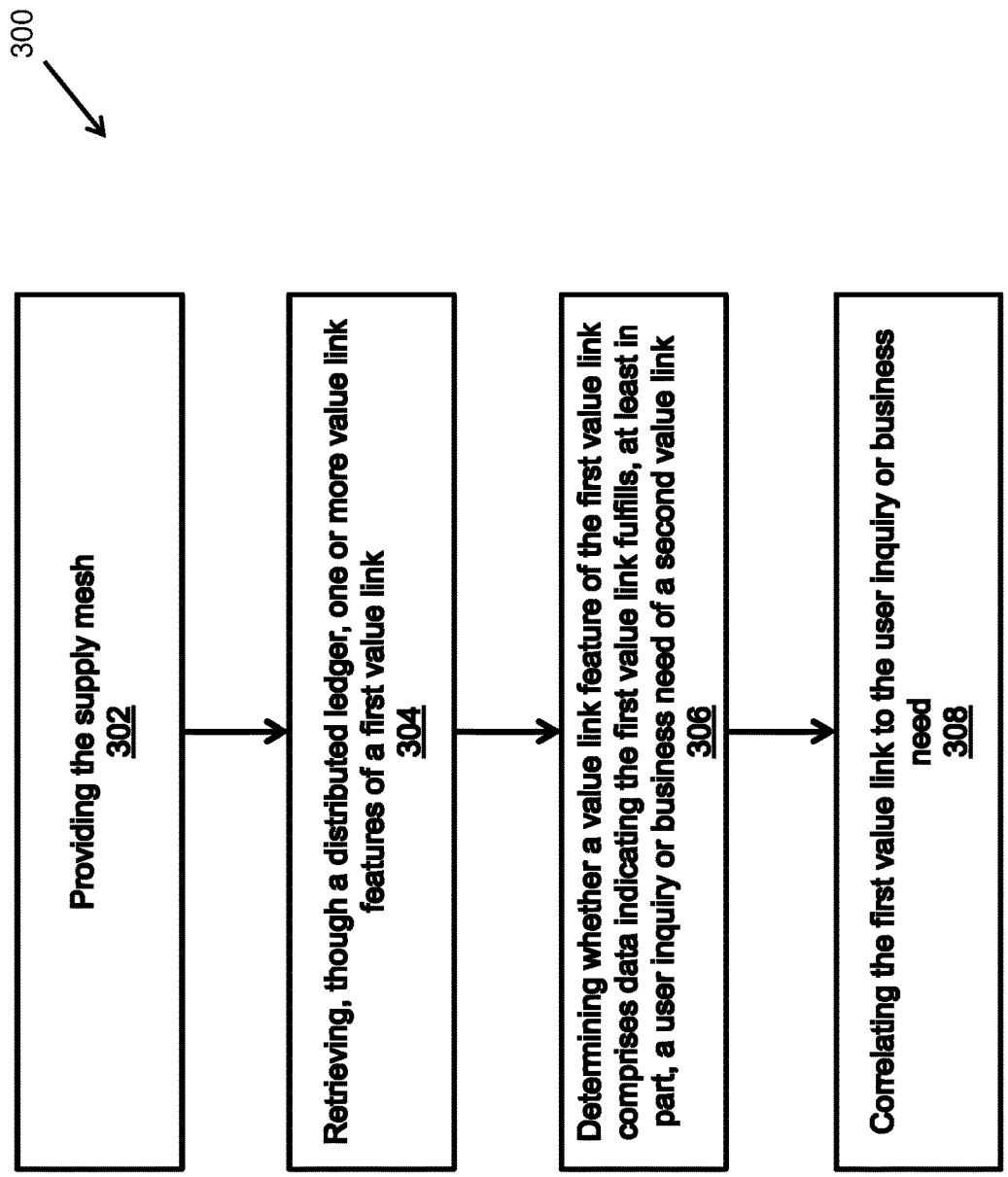
FIG. 3 is a schematic block flowchart illustrating one embodiment of a method for bidirectional data transfer within a supply mesh.

FIG. 3 depicts one embodiment of a method 300. The method 300 may include a computer-implemented method for bidirectional data transfer within a supply mesh. The method 300 may include providing 302 the supply mesh. The supply mesh may include a supply mesh similar to a supply mesh generated by the method 100. The supply mesh may include a supply mesh similar to the supply mesh 200. The supply mesh may include one or more value links. The supply mesh may include one or more bidirectional transitions. A bidirectional transition may include a bidirectional flow. A bidirectional transition may connect two value links.

The method 300 may include retrieving 304 one or more value link features of a first value link. In one embodiment, the retrieving 304 may include retrieving the one or more value link features though a distributed ledger. The retrieving 304 though the distributed ledger may include retrieving entity data through the distributed ledger and generating one or more value link features based on the entity data. In one embodiment, retrieving 304 the one or more value link features may include selecting one or more value link features of the first value link already in the supply mesh.

The method 300 may include determining 306 whether a value link feature of the first value link fulfills, at least in part, a user inquiry or business need of a second value link. A user inquiry may include a query for data in the supply mesh that meets a criteria specified in the query. A business need may include a condition that a user of the supply mesh would like fulfilled. A user query or business need may include a search for a value link that includes a value link feature, a value link feature with a certain value, a transition that connects to a certain value link or a value link with a certain value link feature, or the like, and the user query may include the search criteria.

In one embodiment, determining 306 whether a value link feature of the first value link fulfills, at least in part, a user inquiry or business need of a second value link may include comparing the value link feature of the first value link to the user query or business need. For example, the comparison may include comparing price portion of the user query or business need to a price value link feature of the first value link. In another embodiment, the comparison may include comparing a product name of the user query or business need with a value link feature of the first value link that includes a list of products the first value link sells, supplies, or the like.

In some embodiments, the method 300 may include determining 306 whether a transition of the one or more transitions fulfills, at least in part, the user inquiry of business need. In some embodiments, a user query or business need may relate to a relationship between two entities. For example, the user business need may indicate a need for a value link that receives a product from a value link specified in the user business need. In one embodiment, determining 306 whether the value link feature of the first value link comprises data indicating the first value link fulfills, at least in part, the user inquiry or business need may include determining whether the value link feature indicates the first value link supplies at least one of a good, a service, and data contained in the user inquiry or business need.

The method 300 may include correlating 308 the first value link to the user inquiry or business need. Correlating 308 the first value link to the user inquiry or business need may include providing a response to the user query or business need. The response may include one or more value links that fulfill the user query or business need. The response may include one or more transitions that fulfill the user query or business need.

In one embodiment, the method 300 may include forming a business path. The business path may include the first value link and the second value link. As used herein, the term "business path" means a subsection of the supply mesh. A business path may include two or more value links and at least one transition connecting two of the value links in the business path. In some embodiments, each value link of the business path has a path to each of the other value links of the business path. This does not necessarily mean that each value link is directly connected though a transition to each of the other value links in the business path.

In some embodiments, the two or more value links and the at least one transition of a business path may relate to a product, a service, or data. The business path may relate to moving the product, service, or data from an entity represented by one value link to another entity represented by another value link. In some embodiments, a business path may include one or more beginning value links. A business path may include one or more ending value links. A beginning value link may include a value link where the product, service, or data originates. An ending value link may include a value link where the product service, or data is no longer passed on to another value link. Whether a value link is a beginning or ending value link may be based on the product, service, or data involved, or user configuration, or the like.

In one example, a business path may include a supply chain. In another embodiment, forming a business path may include designating the two or more value links in the business path as part of the business path. Forming the business path may include designating one or more transitions as part of the business path. The transitions of the business path may connect the value links of the business path. In yet another embodiment, forming a business path may include making data available to the distributed ledger. The data may include data about the business path, data about forming the business path, or the like. The data may include the value links, the transitions, or the like of the business path.

In some embodiments, the method 300 may include adding a transition to the business path. The transition, in one embodiment, may include a transition generated in response to forming the business path. In another embodiment, the transition may connect the first value link and the second value link. In one embodiment, forming a business path may include adding a third value link to the business path, and wherein the third value link is disposed between the first value link and the second value link in the business path.

Figure 4A:
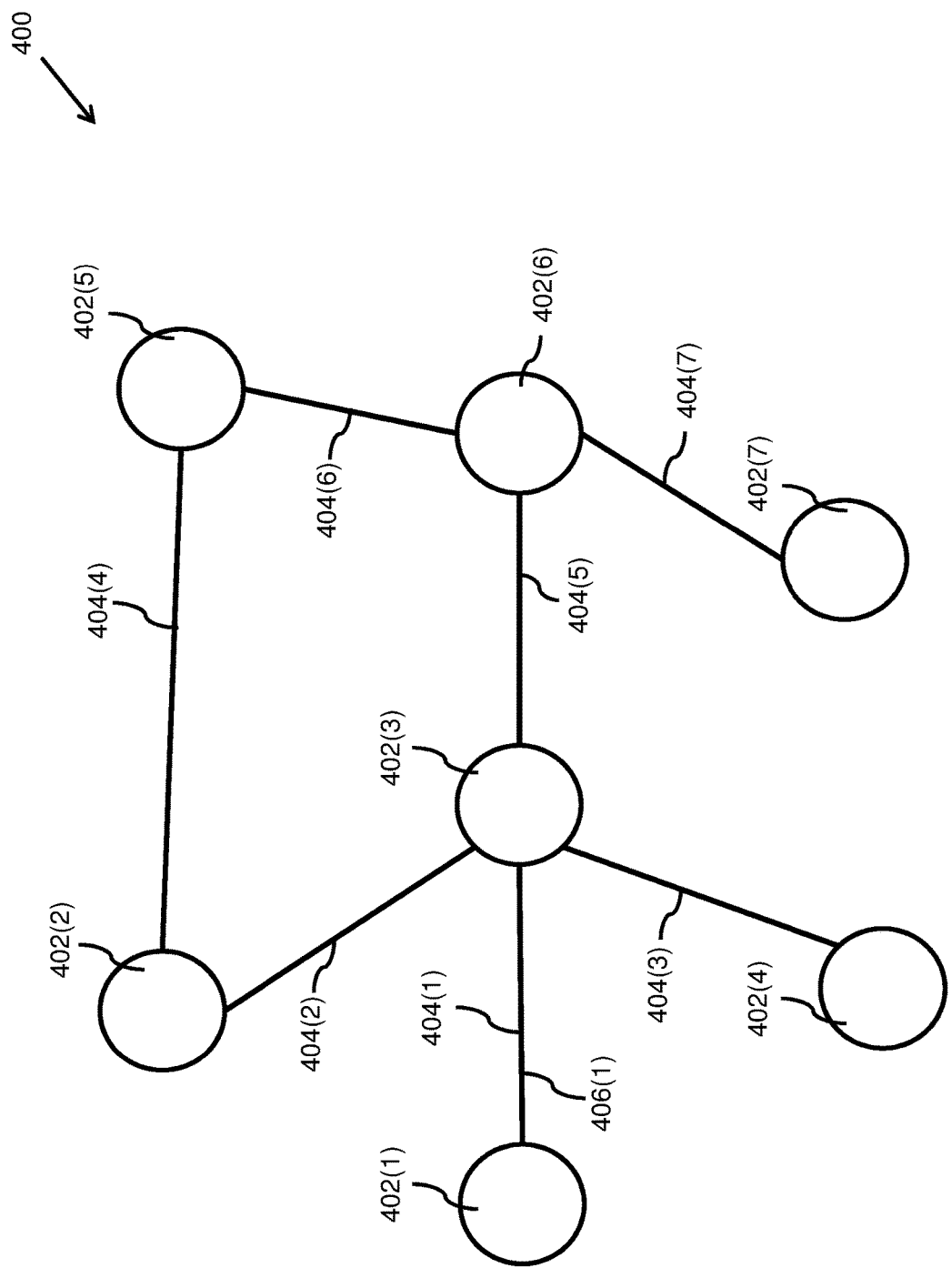
FIG. 4A is a schematic block diagram illustrating one embodiment of a supply mesh.

FIG. 4A depicts one embodiment of a supply mesh 400. The supply mesh 400 may include one or more value links 402(1)-(7) and one or more transitions 404(1)-(8) as described herein. The value link 402(1) may represent Business A, a mining company. Business A may mine ore. Business A may send the ore it mines to Business B, a Manufacturer, represented by value link 402(3). This relationship of Business A sending ore to Business B may be represented by the transition 404(1). Business B may process the received ore into metal sheets and then use those sheets to produce girders.

In one embodiment, Business C, a construction company may be represented by value link 402(7). Business C may be in need of girders for the construction it performs. Business C may have access to the supply mesh 400 through a supply mesh platform. The supply mesh platform may provide 302 the supply mesh 400. In one embodiment, retrieving 304, through a distributed ledger, one or more value link features of a first value link 402 may include retrieving a value link feature that includes that Business B supplies girders. In this example, the first value link 402 may include the value link 402(3), and the second value link 402 may include the value link 402(7). Determining 306 whether a value link feature of the first value link includes data indicating the first value link fulfills, at least in part, a user inquiry or business need of the second value link may include determining whether the value link feature of Business B supplying girders fulfills, at least in part, the user inquiry or business need of Business C. The user inquiry of the Business C may include whether a value link 402 supplies girders, whether a value link 402 supplies girders below a price specified in the query, whether a value link 402 supplies girders and can ship them to the Business C within a time period specified in the query, or the like. In one embodiment, correlating 308 the first value link to the user inquiry or business need may include determining that Business B does fulfill Business C's user inquiry or business need.

In one embodiment of the example, forming a business path may include forming a business path from the value link 402(1) to the value link 402(7). The business path may relate to the product moving from the value link 402(1) to the value link 402(7), i.e. the girders. The value link 402(1) may include the beginning value link 402. This may be because no other value link 402 of the supply mesh 400 supplies something to Mining Company A that is involved with the metal sheets. The value link 402(7) may include the ending value link 402 of the business path because no other value link 402 of the supply mesh 400 receives something involved with the metal sheets.

Figure 4B:
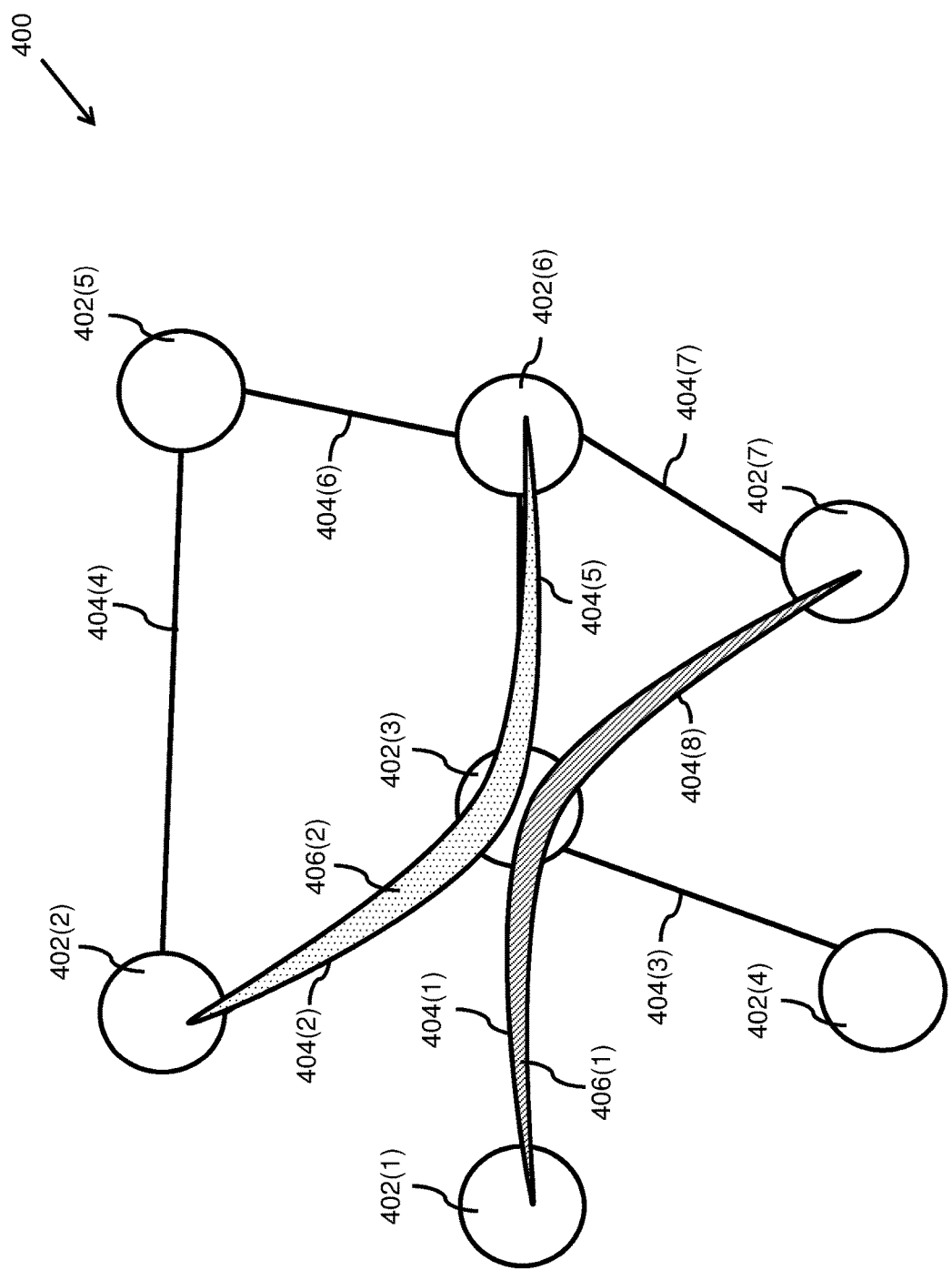
FIG. 4B is a schematic block diagram illustrating one embodiment of a supply mesh.

The business path may include the first value link 402(3) and the second value link 402(7). In one embodiment, adding a transition to the business path may include adding a transition 404(8). The transition 404(8) may connect the first value link 402(3) and the second value link 402(7). FIG. 4B depicts one embodiment of the supply mesh 400. The supply mesh 400 may include the transition 404(8) in response to forming the business path 406(1).

In some embodiments, forming a business path may include adding a third value link to the business path. The third value link may be disposed between the first value link and the second value link. For example, in FIG. 4B, instead of Business B performing its own shipping to Business C, Business B may have Business D, a shipping company, represented by value link 402(6) ship the girders to Business C. In this example, the third value link may include the value link 402(6). The value link 402(6) may be disposed between the first value link 402(3) and the second value link 402(7).

In some embodiments, a value link 402 may be involved in multiple business paths 406. For example, as shown in FIG. 4B, Manufacturer A, represented by value link 402(3), may manufacture multiple products from materials received by different sources and may send the manufactured products to different destinations. The value link 402(3) may be in the business path 406(1) and the business path 406(2). In one embodiment, a business path 406 may not branch to two or more value links 402 from a single value link 402. For example, as seen in FIG. 4B, the business path 406(1) includes the value links 402(1), 402(3) and 402(7) connected through transitions 404(1) and 404(8). In some embodiments, a business path 406 may branch. In some embodiments, a business path 406 may include multiple beginning value links 402 or multiple ending value links 402.

In some embodiments, a business path 406 may include a set of value links 402 and transitions 404 designated by the supply mesh 400 as a business path. The designation may include the value links 402 and transitions involved in the business path 406 including a value link feature showing them as in the business path 406. A business path 406 may include one or more business relationships that existed before being represented by the supply mesh 400. In some embodiments, the supply mesh 400 may add a business path 406 to represent a new relationship between entities represented by the supply mesh 400. In some embodiments, a value link 402 may include a value links feature that designates the value link 402 as a beginning or ending value link 402 in a business path 406.

Figure 5:
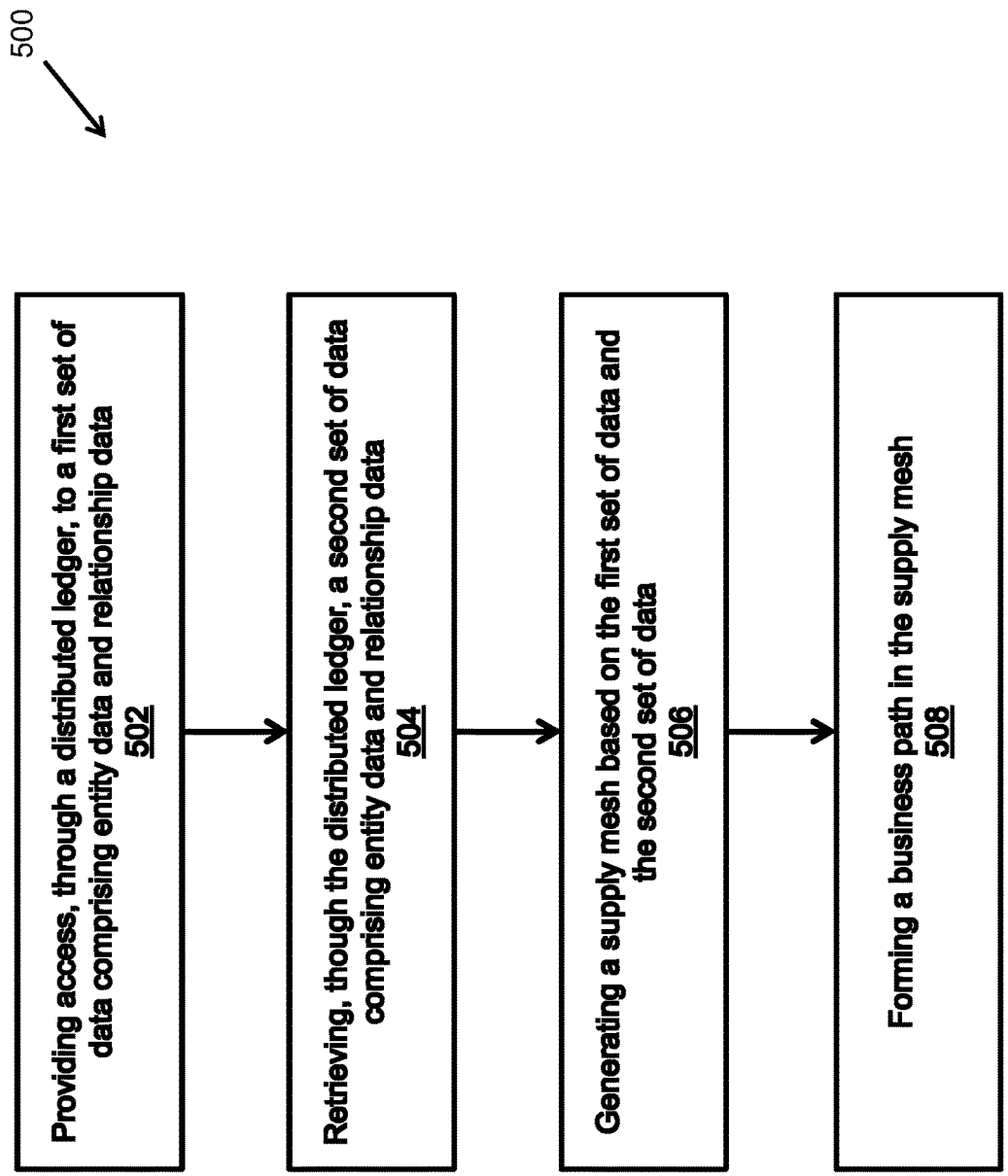
FIG. 5 is a schematic block flowchart illustrating one embodiment of a method for a decentralized supply mesh.

FIG. 5 depicts one embodiment of a method 500. The method 500 may include a computer-implemented method for a decentralized supply mesh platform. The method 500 may include providing 502 access, through a distributed ledger, to a first set of data. The first set of data may include entity data and relationship data. The first set of data may include entity data, relationship data, or the like stored by a user of the supply mesh.

In one embodiment, providing 502 access, through the distributed ledger, to the first set of data may include making the first set of data available for download by a computing device. For example, in some embodiments, the first data may be stored on a data store. The data store may include a computing device, a server, or the like. The data store may be controlled by Business A, which may be a user of the supply mesh platform. Business A may configure the data store that stores the first set of data such that, in response to a request, such as a request from another user of the supply mesh platform, the requester may download the first set of data from the data store.

In some embodiments, providing 502 access, through the distributed ledger, to the first set of data may include restricting from access, based on permissioned configurations, at least part of the first set of data. For example, Business A may not wish for certain data in the data store to be available to other users of the supply mesh. This certain data may include data Business A wishes to share with business partners, but not with entities that are not business partners of Business A. In response, Business A may configure permissions to restrict access to part of the first set of data. Restricting access may include not making the restricted data available for download, viewing, or the like by others.

The method 500 may include retrieving 504, through the distributed ledger, a second set of data. The second set of data may include entity data and relationship data. The second set of data may include data gathered from a plurality of data stores. A data store may include a computing device, a server, or the like. The second set of data may include data stored or controlled by multiple supply mesh users, or the like.

In one embodiment, retrieving 504, through the distributed ledger, the second set of data may include downloading the second set of data from at least one computing device. For example, Business A may use the distributed ledger to obtain a location of at least part of the second set of data. The location may be on a data store. In response to obtaining the location, Business A may send a request to the data store to download at least part of the second set of data from the data store. In some embodiments, the second set of data may be stored on multiple data stores. In response, Business A may obtain multiple locations from the distributed ledger and may download the second set of data from the multiple data stores.

In one embodiment, retrieving 504, through the distributed ledger, the second set of data may include retrieving a subset of the second set of data, the subset based on permissioned configurations. For example, Business A may request data from the second set of data stored on a data store controlled by Business B. Business B may configure the data store to make available only certain data from the second data set for download. In response, in response to the request from Business A, Business A may only download from the data store, unpermissioned data from the second set of data.

In some embodiments, the method 500 may include generating 506 a supply mesh based on the first set of data and the second set of data. The supply mesh may include two or more value links based on the entity data of the first and second sets of data. The supply mesh may include one or more transitions. Each transition may connect two value links based on the relationship data of the first and second sets of data. In one embodiment, the method 500 may include forming 508 a business path in the supply mesh. The business path may include at least two value links connected via a transition.

In one embodiment, in response to making the first set of data available through a distributed ledger and retrieving the second set of data through the distributed ledger, the entity data and relationship data may include decentralized and distributed data. The data may be decentralized because no single party controls the data. The data may be distributed because the data is located on multiple computing devices. In another embodiment, in response to generating the supply mesh based on the first set of data and the second set of data, or in response to forming a business path in the supply mesh, using the supply mesh may include a decentralized, distributed process. Using the supply mesh may be decentralized because no one computing device, system, user, or the like controls generating the supply mesh, forming a business path, or the like. Using the supply mesh may be distributed because different users can use the supply mesh platform and use data located at different locations. In one embodiment, each supply mesh user may generate, use, store, or the like its own copy of the supply mesh. A user's copy of the supply mesh may include different data than another user's copy of the supply mesh because different users may have different permissions to view certain data or the like.

To help define decentralized, distributed data and process execution, it may be helpful to contrast them with centralized and undistributed data and process execution. In contrast to decentralized, distributed data that is stored in multiple locations, each location being controlled by a different party, centralized data may include data controlled by a single party. Undistributed data may include data that may be stored in one location controlled by the single party. In some embodiments, the location may be on a server, in a database, or the like. Thus, in the supply mesh platform, while one party may control part of the supply mesh data (e.g. a supply mesh user may control entity or relationship data about itself), no one party controls all of the supply mesh data. In contrast to decentralized, distributed process execution where no one party controls generating or using the supply mesh, centralized processes execution may include executing a computer process on a computer or group of computers controlled by one party. In some embodiments, the computer may include an application server that executes the centralized, undistributed computer application. Users of the centralized, undistributed application may use the application subject to the controlling party's governance.

Figure 6:
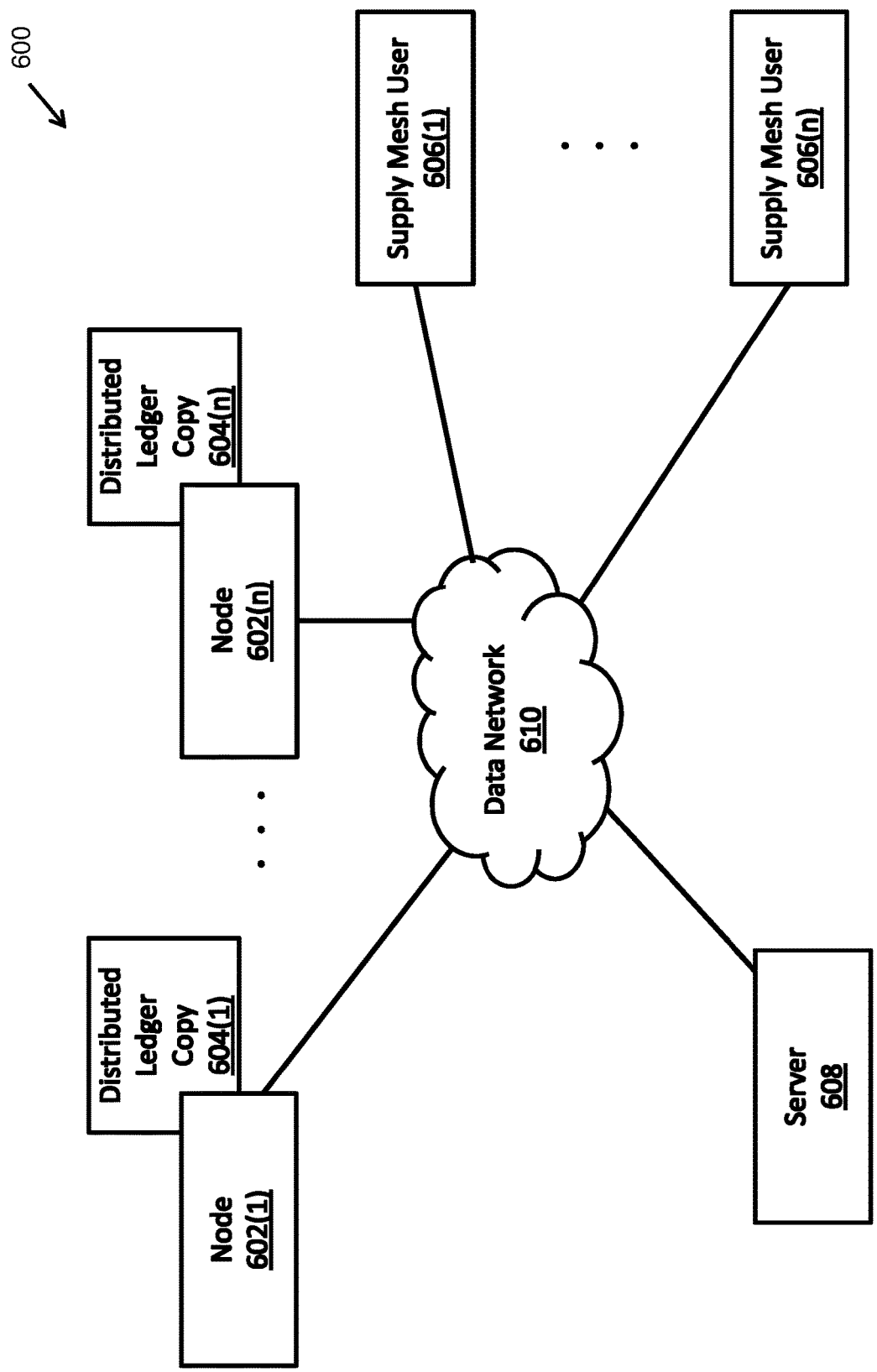
FIG. 6 is a schematic block diagram illustrating one embodiment of a system for a supply mesh.

FIG. 6 depicts one embodiment of a system 600 for a supply mesh platform. In one embodiment, the system 600 may include one or more nodes 602(1)-(n). The system 600 may include one or more distributed ledger copies 604(1)-(n). A node 602 may include a distributed ledger copy 604. The system 600 may include one or more supply mesh users 606(1)-(n). The system 600 may include a server 608. The system 600 may include a data network 610. The one or more nodes 602, supply mesh users 606, or server 608 may be in data communication with each other over the data network 610.

In one embodiment, the system 600 may include one or more nodes 602. A node 602 may include a computing device. A computing device may include a laptop computer, a desktop computer, a tablet computer, or the like. In some embodiments, a node 602 may store a copy of a distributed ledger 604. As described above, a distributed ledger may include copies of a data store that are synchronized and distributed across multiple nodes 602. For example, in some embodiments, the distributed ledger may include a blockchain or the like. In one embodiment, a distributed ledger copy 604 may store access to data about a supply mesh. For example, a distributed ledger copy 604 may store access to data about the one or more value links, the one or more transitions, a business path, or the like. The node 602 may include software for synchronizing and distributing the data of the distributed ledger.

In one embodiment, the system 600 may include one or more supply mesh users 606. A supply mesh user 606 may include a computing device. In some embodiments, a supply mesh user 606 may include a node 602. For example, a supply mesh user 606 may store a distributed ledger copy 604 and may include the software for synchronizing and distributing the data of the distributed ledger. In one embodiment, the supply mesh user 606 may include software for at least part of the supply mesh. For example, the supply mesh user 606 may include software for accessing the data referenced by the distributed ledger, generating the supply mesh, or the like.

In one embodiment, a supply mesh user 606 may store entity data, relationship data, or the like. In another embodiment, a supply mesh user 606 may store entity data, relationship data, or the like on a separate computing device, such as a server. In some embodiments, in response to adding entity data, relationship data, or the like to the supply mesh user 606, a server, or the like, the supply mesh user 606 may make the added data available to the distributed ledger. Making the data available may include adding data to the distributed ledger, and the data may include the location of the added data on the supply mesh user 606. In response to the distributed ledger indicating that the added data is available, another supply mesh user 606 may access the added data. Accessing the added data may include the supply mesh user 606 downloading or copying the added data, or the like. In response, the supply mesh user 606 may update a copy of the supply mesh stored on the supply mesh user 606.

For example, in one embodiment, the supply mesh user 606(1) may store entity data and relationship data about itself. The entity data and relationship data may be available to other supply mesh users 606(2)-(n) through the distributed ledger 604. The supply mesh user 606(1) may add data about a feature about itself, for example, that it sells a certain product at a certain price, to its entity data. In response, the supply mesh user 606(1) may add data to the distributed ledger 604. The data may include a location of the added feature data on the supply mesh user 606(1). The supply mesh user 606(2) may check the distributed ledger 604, determine that the distributed ledger 604 includes new data, and may download the added feature data from the supply mesh user 606(1). The supply mesh user 606(2) may update its supply mesh.

In one embodiment, the system 600 may include the server 608. The server 608 may include a computing device that is capable of requesting or receiving data via the data network 610. The server 608 may include a computing device capable of storing or processing data. Examples of the server 608 may include an application server, a database server, or the like. In some embodiments, the server 608 may include multiple servers.

In some embodiments, the server 608 may facilitate a supply mesh user's 606 use of the supply mesh. The server 608 may store a list of the supply mesh users 606(1)-(n). In one embodiment, the server 608 may provide software for the supply mesh to a supply mesh user 606. The server 608 may help provide access to the distributed ledger. For example, the server 608 may provide a supply mesh user 606 with a location of one or more nodes 602. The location may include a network location, such as a uniform resource locator (URL) or the like. In another embodiment, the server 608 may include data of the supply mesh. The data may include data entity data, relationship data, or the like. In some embodiments, the server 608 may provide this data to a supply mesh user 606.

In one embodiment, a supply mesh user 606 and the server 608 may include a client-server model or a software as a service (SaaS) model. The software of the supply mesh user may include a client program. The server 608 may access the data referenced by the distributed ledger, and the server 608 may provide this data to a supply mesh user 606. The server 608 may process the data before sending it to the supply mesh user 606. For example, the server 608 may filter some retrieved data from the supply mesh user 606 based on system configurations, user configurations, or the like. In some embodiments, the server 608 may generate the supply mesh based on the retrieved data and send the supply mesh to the supply mesh user 606.

In some embodiments, the system 600 may include the data network 610. The data network 610 may include a medium or architecture capable of facilitating communication or data transfer. Examples of the data network 610 may include an intranet, a wireless local area network (WLAN), a Wide Area Network (WAN), a Local Area Network (LAN), a Personal Area Network (PAN), the Internet, Power Line Communications (PLC), a cellular network, or the like.

In one embodiment, in response to the system 600 using a distributed ledger for data retrieval, the system 600 may include decentralized and distributed data collection. In other words, in response to no one computing system, entity, or the like storing access to the data used in the supply mesh platform, no one entity may control the data, its use, or the like. In one embodiment, in response to the system 600 using the distributed ledger and the one or more supply mesh users, each supply mesh user with software for retrieving the supply mesh data from the distributed ledger and generating the supply mesh, the system 600 may include decentralized data consumption and process execution. In other words, because no one computing system, entity or the like controls access to the data and no one entity processes the data to generate and use the supply mesh, a supply mesh user does not depend on a central authority to use the supply mesh platform.

Thus, although there have been described particular embodiments of the present invention of a new and useful supply mesh platform, it is not intended that such references be construed as limitations upon the scope of this invention. The described features, structures, or characteristics of the disclosure may be combined in any suitable manner in one or more embodiments. In the description herein, numerous specific details are provided, such as examples of programming, software, user selections, hardware, hardware circuits, hardware chips, or the like, to provide a thorough understanding of embodiments of the disclosure. One skilled in the relevant art will recognize, however, that the disclosure may be practiced without one or more of the specific details, or with other methods, components, materials, and so forth. In other instances, well-known structures, materials, or operations are not shown or described in detail to avoid obscuring aspects of the disclosure.

As will be appreciated by one skilled in the art, aspects of the present disclosure may be embodied as an apparatus, system, method, computer program product, or the like.

Accordingly, aspects of the present disclosure may take the form of an entirely hardware embodiment, an entirely software embodiment (including firmware, resident software, micro-code, etc.) or an embodiment combining software and hardware aspects. Furthermore, aspects of the present disclosure may take the form of a computer program product embodied in one or more computer readable medium(s) having program code embodied thereon.

Some embodiments may be implemented as a hardware circuit comprising custom VLSI circuits or gate arrays, off-the-shelf semiconductors such as logic chips, transistors, or other discrete components. An embodiment may also be implemented in programmable hardware devices such as field programmable gate arrays, programmable array logic, programmable logic devices or the like.

An embodiment may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure. Aspects of the present disclosure are described herein with reference to flowchart illustrations or block diagrams of methods, apparatuses, systems, or computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flow chart diagrams included herein are generally set forth as logical flow chart diagrams. As such, the depicted order and labeled steps are indicative of one embodiment of the presented method. Other steps and methods may be conceived that may be equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The schematic flowchart diagrams and/or schematic block diagrams in the Figures illustrate the architecture, functionality, and operation of possible implementations of apparatuses, systems, methods and computer program products according to various embodiments of the present disclosure. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

What is claimed is:

1. A computer-implemented method for producing a supply mesh, comprising:
    retrieving, from a distributed ledger, first entity data, wherein the first entity data comprises data representing a first plurality of entities;
    retrieving, from the distributed ledger, first relationship data, wherein the first relationship data comprises data representing relationships between at least a portion of the first plurality of entities; and
    generating the supply mesh, comprising
        generating two or more value links based on the first entity data, wherein each value link of the two or more value links includes
            a data representation of a business entity of the first plurality of entities,
            a value link feature, wherein the value link feature includes a data representation of a feature of the business entity, and
        generating one or more transitions based on the first relationship data, wherein each transition
            connects two value links of the two or more value links of the supply mesh, and
            includes a data representation of a business relationship between the two business entities represented by the value links that are connected via the transition.

2. The computer-implemented method of claim 1, wherein retrieving data from the distributed ledger comprises retrieving data referenced by the distributed ledger.

3. The computer-implemented method of claim 1, wherein the data representation of the feature of the business entity of the value link feature comprises at least one of
    the business entity's name;
    the business entity's location
    an inventory of product of the business entity; or
    whether the business entity provides a specific product or service.

4. The computer-implemented method of claim 1, wherein:
    generating the two or more value links comprises generating a first value link; and
    the first value link includes a data representation of a plurality of business entities of the first plurality of entities.

5. The computer-implemented method of claim 1, wherein:
    generating the two or more value links comprises generating a first value link and a second value link;
    the first value link includes a data representation of a first department of a business entity of the first plurality of entities; and
    the second value link includes a data representation of a second department of the business entity.

6. The computer implemented method of claim 1, wherein generating a transition connecting a first value link to a second value link comprises generating the transition based on a flow of at least one of data, goods, or services from the first value link to the second value link.

7. The computer-implemented method of claim 1, further comprising:
    making available, through the distributed ledger, second entity data, wherein the second entity data includes data representing a second plurality of entities;
    making available, through the distributed ledger, second relationship data, wherein the second entity data includes data representing relationships between at least a portion of the second plurality of entities; and
    updating the supply mesh based on the second entity data and second relationship data.

8. The computer-implemented method of claim 7, wherein the second relationship data comprises at least one of:
   data comprising one or more additional relationships between at least a portion of the first plurality of entities; or
   data comprising one or more relationships between at least a portion of the first plurality of entities and at least a portion of the second plurality of entities.

9. The computer-implemented method of claim 1, further comprising filtering, from use by a user in response to one or more permissioned configurations, at least one of:
   a value link;
   a value link feature; or
   a transition.

10. The computer-implemented method of claim 1, further comprising at least one of:
   removing a value link from the supply mesh;
   removing a value link feature from the supply mesh; or
   removing a transition from the supply mesh,
   wherein removing the value link, value link feature, or transition from the supply mesh comprises invalidating the corresponding data in the distributed ledger.

11. A computer-implemented method for bidirectional data transfer within a supply mesh, comprising:
   providing the supply mesh, wherein the supply mesh comprises
      two or more value links, each value link including
         a data representation of a business entity of a first plurality of entities, and
         a value link feature, wherein the value link feature includes a data representation of a feature of the business entity, and wherein the value link feature is based on data retrieved from a distributed ledger, and
      one or more transitions, wherein
         each transition connects two value links, and
         each transition includes a data representation of a business relationship between the two business entities represented by the value links that are connected via the transition, and wherein the transition is based on data retrieved from the distributed ledger;
   determining whether a value link feature of a first value link of the supply mesh comprises data indicating the first value link fulfills, at least in part, a user inquiry or business need of a second value link of the supply mesh; and
   correlating the first value link to the user inquiry or business need.

12. The computer-implemented method of claim 11, further comprising determining whether a transition of the one or more transitions fulfills, at least in part, the user inquiry of business need.

13. The computer-implemented method of claim 11, wherein determining whether the value link feature of the first value link comprises data indicating the first value link fulfills, at least in part, the user inquiry or business need comprises determining whether the value link feature indicates the first value link supplies at least one of a good, a service, or data contained in the user inquiry or business need.

14. The computer-implemented method of claim 11, further comprising forming a business path, wherein the business path comprises the first value link and the second value link.

15. The computer-implemented method of claim 14, further comprising adding a transition to the business path.

16. The computer-implemented method of claim 15, wherein the transition connects the first value link and the second value link.

17. The computer-implemented method of claim 14 wherein forming the business path comprises adding a third value link to the business path, and wherein the third value link is disposed between the first value link and the second value link in the business path.

18. A computer-implemented method, comprising:
   using a cryptographic distributed ledger to record transaction data between at least two business entities;
   providing a supply mesh platform, wherein the supply mesh platform is capable of:
      permitting each business entity to view said transaction data of every other business entity associated with said supply mesh platform, wherein said transaction data comprises an inventory level and pricing information of said every other business entity,
      executing, by a first business entity, an inquiry function of the supply mesh platform to determine whether said transaction data indicates that a second business entity fulfills a business need of the first business entity,
      obtaining, from the cryptographic distributed ledger, further transaction data between the first and second business entities, indicating the formation of a business relationship between the first and second business entities.

19. The computer-implemented method of claim 18, wherein the business relationship between the first and second business entities indicated by said further transaction data includes the first business entity supplying a product to the second entity.

20. The computer-implemented method of claim 18, further comprising storing said transaction data on a client device associated with the first business entity.

* * * * *